United States Patent [19]

Nishijama et al.

[11] Patent Number: 5,253,303
[45] Date of Patent: Oct. 12, 1993

[54] CHARACTER RECOGNIZING METHOD AND APPARATUS THEREOF

[75] Inventors: Yasuo Nishijama; Ichiro Kaneko, both of Tokyo, Japan

[73] Assignee: NEC Corporation, Japan

[21] Appl. No.: 799,744

[22] Filed: Nov. 22, 1991

Related U.S. Application Data

[63] Continuation of Ser. No. 554,178, Jul. 16, 1990, abandoned, which is a continuation of Ser. No. 308,768, Feb. 9, 1989, abandoned.

[30] Foreign Application Priority Data

Feb. 15, 1988 [JP] Japan ................................ 63-30997

[51] Int. Cl.[5] ............................................. G06K 9/36
[52] U.S. Cl. ............................................ 382/9; 382/13
[58] Field of Search ........................ 382/9, 10, 13, 24

[56] References Cited

U.S. PATENT DOCUMENTS

| | | | |
|---|---|---|---|
| 4,527,283 | 7/1985 | Ito et al. | 382/9 |
| 4,528,692 | 7/1985 | Umeda et al. | 382/9 |
| 4,607,385 | 8/1986 | Maeda | 382/9 |
| 4,731,857 | 3/1988 | Tappert | 382/9 |
| 4,764,972 | 8/1988 | Yoshida et al. | 382/13 |

Primary Examiner—Michael T. Razavi
Assistant Examiner—Yon J. Couso
Attorney, Agent, or Firm—Laff, Whitesel, Conte & Saret

[57] ABSTRACT

A character recognizing method includes steps of detecting a character using an end of the character line as a start point, normalizing the detected character, comparing the normalized value with a predetermined standard pattern, and detecting a point having a minimum distance difference from the standard pattern as a segmentation point between neighboring characters.

7 Claims, 3 Drawing Sheets

CHARACTER RECOGNIZING METHOD AND APPARATUS THEREOF

This application is a continuation, of application Ser. No. 07/554,178 filed Jul. 16, 1990 which is a continuation of Ser. No. 07/308,768 filed Feb. 9, 1989, now both abandoned.

BACKGROUND OF THE INVENTION

The present invention relates to character recognizing method and apparatus and, more particularly, to character recognizing method and apparatus capable of detecting a segmentation point of a character from a character line, thereby recognizing an individual character.

In a conventional apparatus of this type, a method is proposed in which upon recognition of a character line, an average pitch of one character is calculated and characters are segmented and recognized one by one from the character line in accordance with information about the average pitch.

In the above conventional character recognizing apparatus, however, each character is recognized on the basis of the average pitch. Therefore, if characters in a character line to be recognized are arranged at non-uniform pitches, detection is ended in the middle of a character. As a result, characters cannot be read or are erroneously read.

SUMMARY OF THE INVENTION

It is, therefore, an object of the present invention to provide character recognizing method and apparatus capable of recognizing characters one by one even if the characters are arranged at non-uniform pitches in a character line.

In order to achieve the above object of the present invention, there is provided a character recognizing method of segmenting characters one by one from a character line and recognizing the characters, comprising steps of detecting a character using an end of the character line as a start point, normalizing the detected character, comparing the normalized value with a predetermined standard pattern, and detecting a point having a minimum distance difference from the standard pattern as a segmentation point between neighboring characters.

In addition, in order to achieve the above object of the present invention, there is provided a character recognizing apparatus for segmenting characters one by one from a character line and recognizing the characters, comprising a detecting means for detecting a character using an end of the character line as a start point, a normalizing means for normalizing the detected character, a comparing means for comparing the normalized value with a predetermined standard pattern, and a segmentation point detecting means for detecting a point having a minimum distance difference from the standard pattern as a segmentation point between neighboring characters.

DETAILED DESCRIPTION OF THE PREFERRED EMBODIMENT

Prior to a description of an embodiment of the present invention, an operational principle will be described first. When a character line is to be detected as a video signal, this video signal can be considered such that its main and sub scan directions change along the time base. As the video signal gradually changes, a specific character or character line is two-dimensionally formed. In this case, a video signal of a character line having non-uniform pitches is offset or expanded/compressed along the time base direction of the sub scan direction as compared with a video signal of a character line having a uniform pitch. In order to recognize a character line having a non-uniform pitch, therefore, a difference and expansion/compression along the time base must be corrected.

Figure 2A:
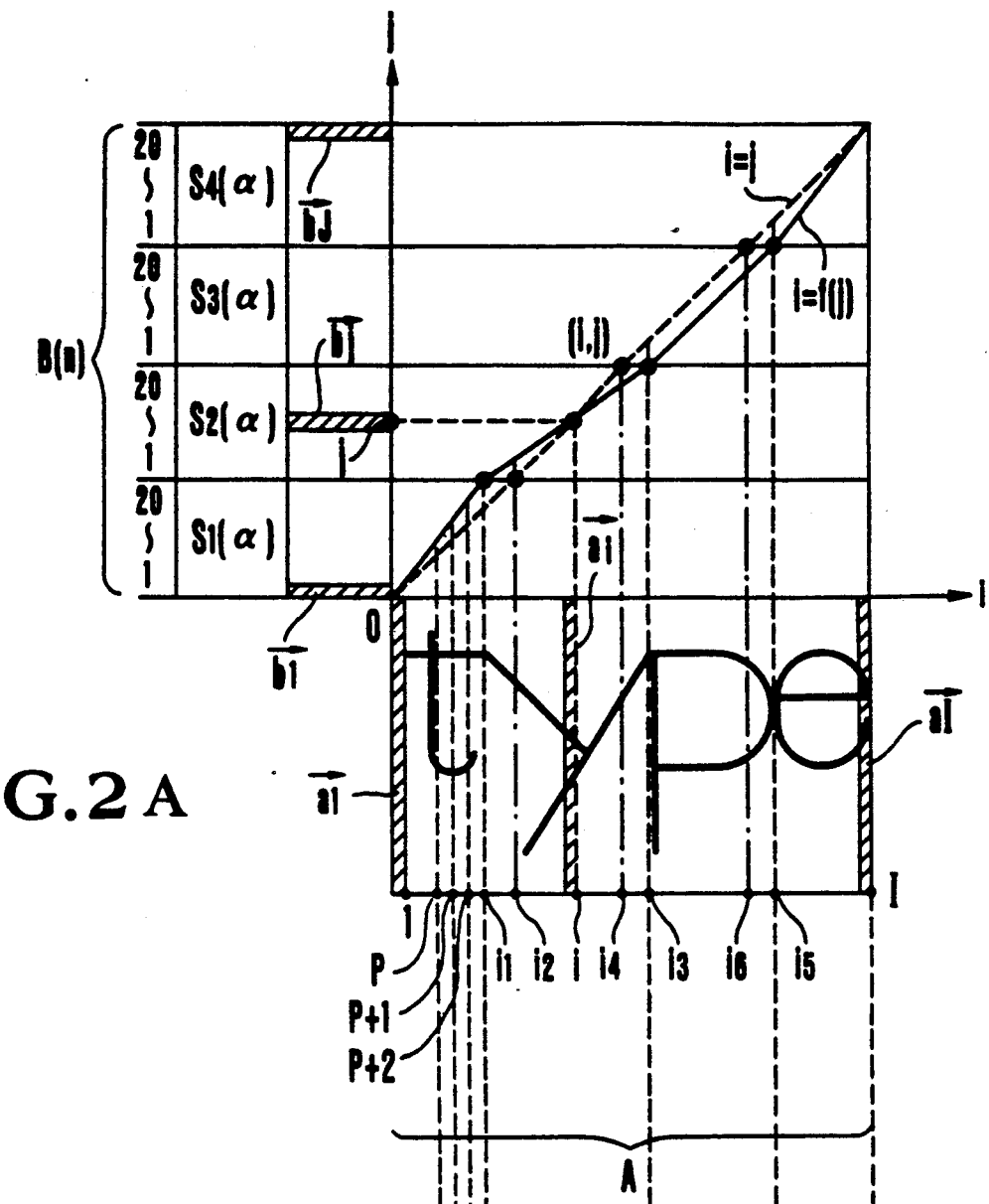
FIGS. 2A and 2B, are graphs showing operation characteristics of the apparatus.
Figure 2B:
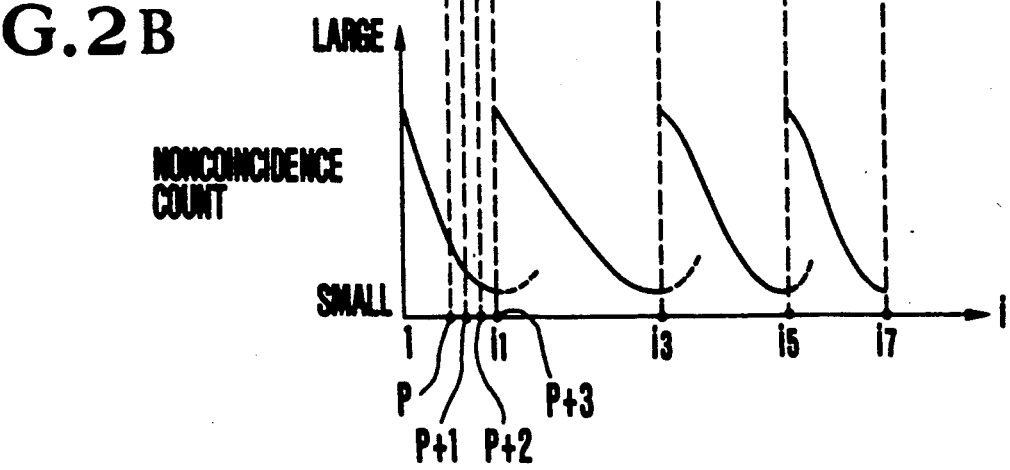

A description will be made with reference to graphs in FIGS. 2A and 2B showing operation characteristics. Assume that a character line (TyPe) in which neighboring characters are in contact with each other at non-uniform pitches as shown in FIG. 2A is an input video signal, and that the input signal is given as follows:

$$A = \vec{a}_1 \vec{a}_2 \vec{a}_3 \ldots \vec{a}_i \ldots \vec{a}_I$$

The vector $\vec{a}_i$ represents the feature of an ith input video signal in a sub scan direction and corresponds to an input video signal of one line in a main scan direction. The input video signal A is a time series of the feature vectors and is a set of input video signals of lines 1 to I. A standard pattern (dictionary) B(n) of n character lines is given as follows:

$$B(n) = \vec{b}_1 \vec{b}_2 \vec{b}_3 \ldots \vec{b}_j \ldots \vec{b}_J$$
$$= S_1(\alpha) S_2(\alpha) \ldots S_n(\alpha)$$

The vector $\vec{b}_j$ is a jth feature vector in a sub scan direction of the standard pattern. For the convenience of description, assume that the number of lines of a single standard graphic pattern is 20 and J=20n (FIG. 2A shows a case wherein n=4). $S_n(\alpha)$ represents a standard pattern, and a symbol $\alpha$ represents one of a character categories 0 to 9, a to Z and A to Z. Assume that segmentation points of characters in the input video signal A are $i_1$, $i_3$, $i_5$ and $i_7$ and a function obtained by projecting the segmentation points on the standard pattern is given as follows:

$$i = f(j)$$

Figure 3:
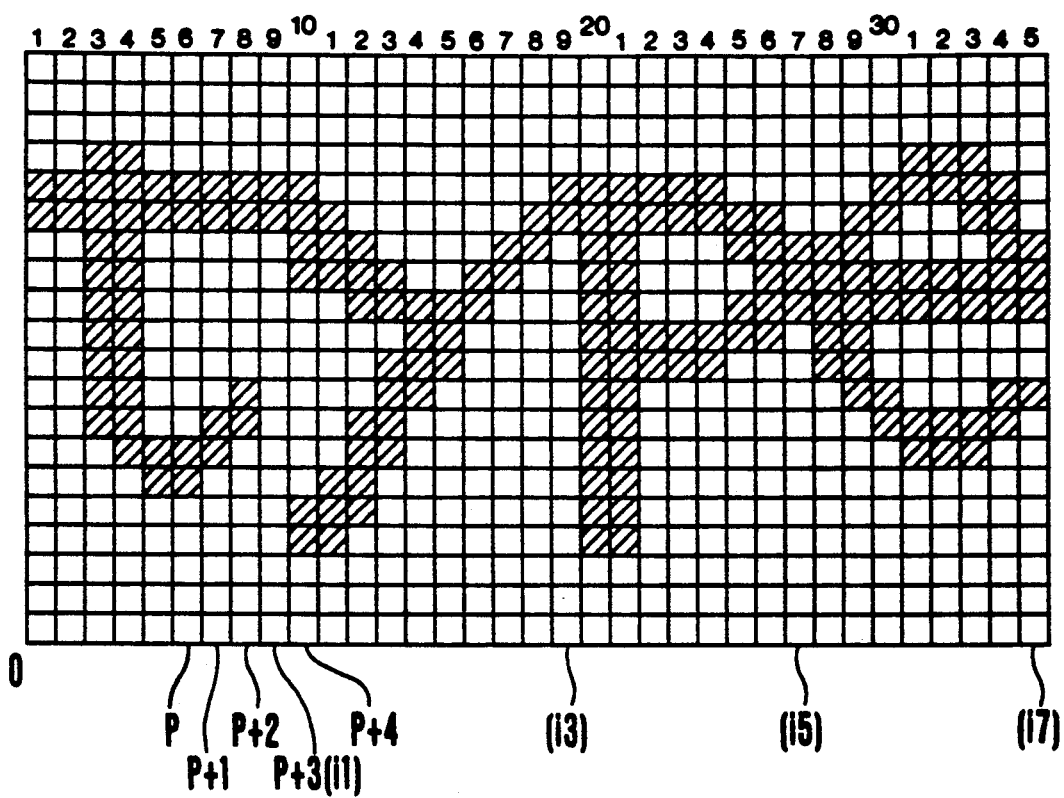
FIG. 3 is an enlarged view showing a character line in FIG. 2A.

This function is called a distortion function. If the distortion function is known, the sub scan direction of the input video signal can be converted by this function to adjust a time base i along the sub scan direction of the standard pattern B(n). In the case of a character line in which neighboring characters are in contact with each other at non-uniform pitches, however, the distortion function cannot be calculated, and therefore another means is required. That is, if a distortion is present between the input video signal and the standard pattern, the similarity between the two is reduced, and a difference on the time base i is increased. On the contrary, if the input video signal is distorted along the sub scan direction to be most similar to the standard pattern, the distortion on the time base i is eliminated, and an optimal distortion function is determined. Therefore, assuming that the points $i_1$, $i_3$ and $i_5$ are located at the points $i_2$, $i_4$ and $i_6$, respectively, in FIG. 2A, the difference between the input video signal and the standard pattern on the time base i is minimized. For example, as shown in an enlarged view of FIG. 3 showing the character line in FIG. 2A, on the basis of a line P not exceeding the width of one character, a character is detected on lines P+1, P+2, P+3, P+4, ... The detected signal is then normalized and compared or collated with the standard pattern $S_1(\alpha)$, thereby detecting the line P+3 (the point $i_1$ in FIG. 2B) on which the difference of the time base i, i.e., a noncoincidence count is minimum. The line P+4 is then considered as a start line to repeat the above processing. By performing such processing for all the characters, a line on which the difference of the time base i is minimum can be detected. Referring to FIG. 2B, the points $i_1$, $i_3$, $i_5$ and $i_7$ represent the detected lines, and the standard patterns $S_1(1)$, $S_2(3)$, $S_3(5)$ and $S_4(7)$ corresponding to these values are character recognition results of respective characters.

As described above, if the distortion function is unknown, a character on lines is detected on the basis of the line P not exceeding the width of one character, and the detected signal is normalized and subjected to the character recognition processing. In this case, on the basis of the position of each line at which a difference between the normalized value and the standard pattern, i.e., the noncoincidence count is minimum, a segmentation position of each character is detected.

Upon character recognition, although the video signals on lines P, P+1, P+2, P+3 and P+4 may be time-sequentially processed, they may be simultaneously processed to increase the operation speed of the character recognition processing. Alternatively, if the processing is started at the same time from both the first line (the first end of a character line) and the last line I (the last end of the character line) along the sub scan direction, the processing speed can be further improved.

Figure 1:
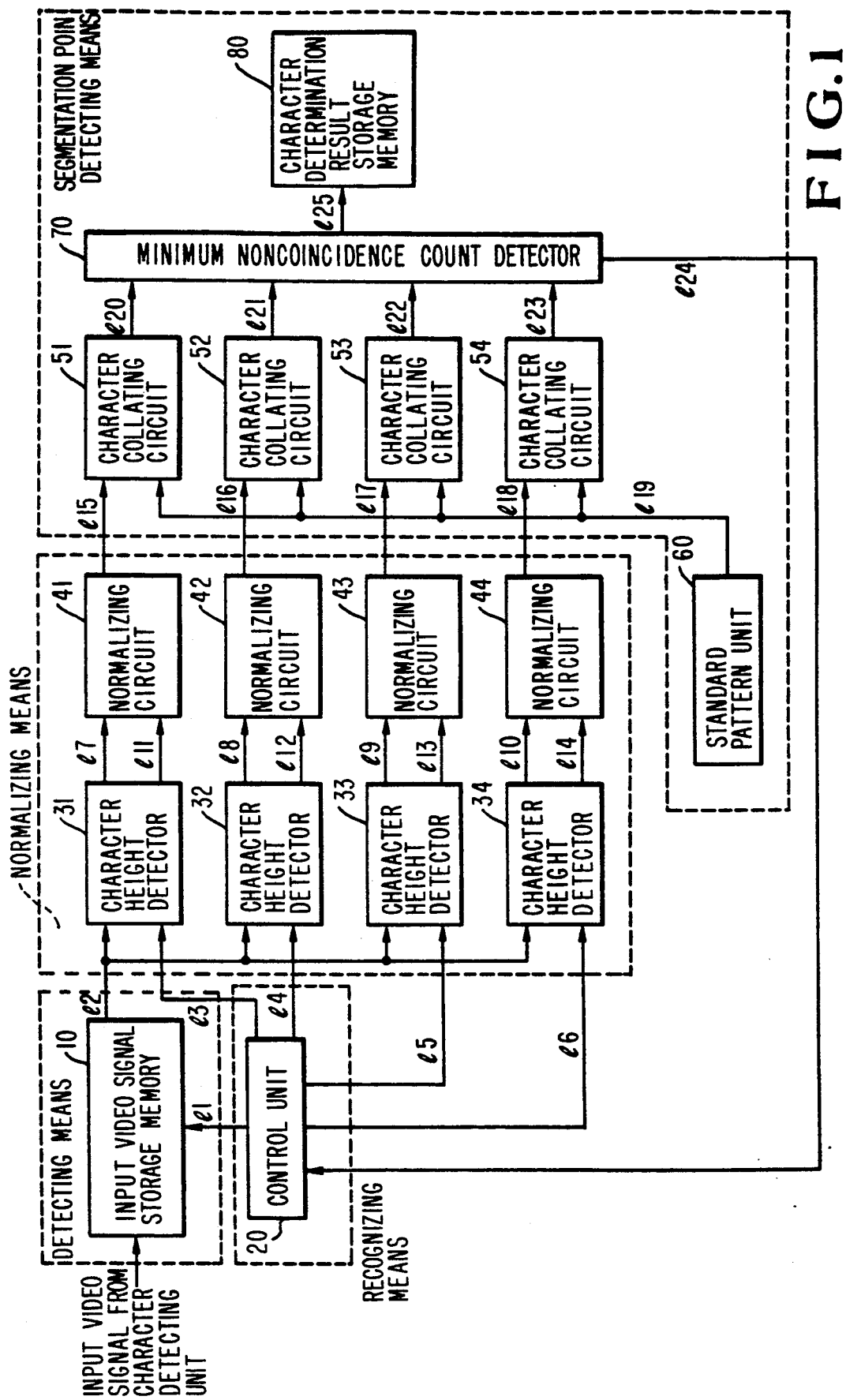
FIG. 1 is a block diagram showing an embodiment of the present invention.

An embodiment of the present invention will be described below. FIG. 1 is a block diagram showing an embodiment of the present invention. Referring to FIG. 1, a detecting means comprises an input video signal storage memory 10, a normalizing means comprises character height detectors 31 to 34 and normalizing circuits 41 to 44, a segmentation point detecting means comprises character collating circuits 51 to 54, a standard pattern unit 60, a minimum noncoincidence count detector 70 and a character determination result storage memory 80. In addition, a control unit 20 is included as a recognizing means.

The input video signal storage memory 10 stores an input video signal as shown in FIG. 2A output from a character detecting unit (not shown). The memory 10 outputs the input video signal to a line 12 in accordance with an address signal output from the control unit 20 to a line 11. On the basis of a control signal output from the control unit 20 to a corresponding one of lines 13 to 16, each of the character height detectors 31 to 34 temporarily stores the input video signal supplied from the memory 10 via the line 12 and detects the height of the character. The control signal supplied to each of the lines 13 to 16 gives the width of the input video signal in the sub scan direction. The line 13 corresponds to the input video signal from the origin to the line P shown in FIG. 2A; the line 14, that from the origin to the line P+1; the line 15, that from the origin to the line P+2; and the line 16, that from the origin to the line P+3.

The normalizing circuits 41 to 44 convert the input video signals into normalized patterns on the basis of input video signals with different widths output from lines 17 to 110 and character height information output from lines 111 to 114, respectively. The patterns normalized by the normalizing circuits 41 to 44 are output to the character collating circuits 51 to 54 via lines 115 to 118, respectively. The character collating circuits 51 to 54 compare and collate the normalized patterns with the standard pattern from the standard pattern unit 60 and output noncoincidence counts in the sub scan direction together with categories to the minimum noncoincidence count detector 70 via lines 120 to 123, respectively. The minimum noncoincidence count detector 70 detects the minimum number in the noncoincidence counts from the character collating circuits 51 to 54 and outputs a line number corresponding to the minimum value to the control unit 20 via a line 124. For example, in FIG. 3, this line number corresponds to the line P+3. The circuit 70 outputs a category corresponding to the minimum noncoincidence count to the character determination result storage memory 80 via a line 125. On the basis of the line number information from the line 124, the control unit 20 outputs a signal obtained by incrementing the previous address signal by one to the input video signal storage memory 10 via the line 11, thereby performing recognition of one character. By repeatedly executing the above series of processing, the entire character line can be recognized.

As described above, according to the present invention, even if neighboring characters are in contact with each other at non-uniform pitches in a character line, each character can be recognized by obtaining a segmentation point between the characters.

In the above embodiment, printed characters are used as an input video signal. According to the present invention, however, hand-written characters or graphic patterns can be recognized.

In the above embodiment, a series of processing to the line P+3 are simultaneously performed. The number of lines of parallel processing, however, is not limited but can be arbitrarily set.

As has been described above, according to the present invention, input video signals of a character line are normalized and then compared with a predetermined standard pattern to detect a segmentation point of each character, thereby recognizing each character. Therefore, even if characters are arranged at non-uniform pitches in a character line, each character can be effectively recognized.

What is claimed is:

1. An apparatus for recognizing contiguous characters arranged in character lines defining a main scanning direction, each of said lines constituting a plurality of characters, at least some of said characters touching each other whereby there is no blank space between characters to identify a segmentation position, said apparatus comprising:

input means for inputting said character lines as 1st, —i-th, —n-th(icn) input video signals in a subscanning direction which is substantially perpendicular to said main scanning direction, each of said characters producing a plurality of said input video signals; each of said input video signals being obtained by scanning at a pitch representing a minimum recognization unit;

detecting means for detecting a plurality of images included within a range extending in order from a starting point of said character line to said i-th to n-th input video signals corresponding to the scanning pitches in order to output 1st to (n-i+1) image signals;

normalizing means for normalizing said 1st to (n−i+1)th image signals in order to output 1st to (n−1+1)th normalized signals;

comparing means for comparing said n normalized signals with a predetermined standard pattern in order to output 1st to (n−1+1)th difference signals representing differences from said standard pattern; and segmentation point detecting means for detecting a minimum difference signal, which is a minimum value, out of said 1st to (n−i+1)th minimum difference signals, and for detecting one of said i-th to n-th input video signals corresponding to said minimum deviation from standard pattern as a segmentation line in order to segment said plurality of characters which touch each other into separate discrete characters.

2. An apparatus according to claim 1, wherein
said detecting means includes a plurality of character height detectors, said normalizing means includes a plurality of normalizing units for normalizing outputs from said character height detectors, each of said character height detectors outputs width information and character height information of an assigned part of an input video signal, each of said normalizing units converts the input video signal into a normalized pattern on the basis of the two pieces of information from a corresponding one of said character height detectors, and said comparing means includes:

a plurality of character collating means, arranged in correspondence with said normalizing units, for comparing the outputs from said normalizing units with the standard pattern and obtaining distance differences with respect to the standard pattern; and extracting means for extracting a position of a minimum distance difference among outputs from said character collating means.

3. An apparatus according to claim 2, wherein said extracting means obtains category information concerning a character to be recognized in accordance with the normalized patterns and the minimum noncoincidence count obtained by comparison.

4. An apparatus according to claim 1, further comprising:

a memory for storing category information concerning the character to be recognized; and recognizing means for, on the basis of the output from said extracting means, shifting the detection start point of the character line and repeatedly executing the processing operation, thereby recognizing the entire character line.

5. A method of recognizing character lines, each of said character lines being a string including at least some interconnected plurality of contiguous characters which are sequentially arranged to form said character lines extending in a main scanning direction, said method comprising:

inputting said character lines as 1st, —i-th, —n-th input video signals arranged in a sub-scanning direction which is substantially perpendicular to said main scanning direction, each of said characters being represented by a plurality of said video signals;

detecting said i-th to n-th input video signals in a range extending from a starting point of said character line in order to produce (n−i+1) image signals;

normalizing said (n−i+1) image signals to make (n−i+1) normalized signals;

comparing said (n−i+1) normalized signals with a predetermined standard pattern to produce (n−i+1) difference signals representing differences from said standard pattern; and detecting a minimum difference signal, which is a minimum value, out of said (n−i+1) difference signals, and detecting one of said i-th to n-th input video signals corresponding to said minimum deviation from a standard signal as a segmentation line in order to segment said string of an interconnecting line in order to segment said string of an interconnecting plurality of characters and thus provide separate discrete characters.

6. An apparatus for recognizing contiguous characters arranged in character lines, each of said lines constituting a plurality of characters at least some of which touch each other, said lines of characters being arranged in a main scanning direction, said apparatus comprising:

input means for inputting said character lines as a plurality of input video signals which are line video signals along a sub-scanning direction which is substantially perpendicular to said main scanning direction, each of said characters producing a plurality of said input video signals;

image signals generating means for generation n image signals which are 1st image signals composed of i number of input video signals from 1st to i-th, to n-th image signal composed of (i+n−1) number of input video signals from 1st to (i+n−1)-th;

normalizing means for normalizing said n image signals in order to output n normalized signals;

comparing means for comparing said n normalized signals with a predetermined standard pattern in order to input n difference signals representing differences from said standard pattern; and segmentation point detecting means for detecting a minimum difference signal, which is a minimum value, out of said n minimum difference signals, and detecting the last input video signal out of said input video signals composing of said image signal corresponding to said minimum difference signals as a segmentation line in order to segment said plurality of characters which touch each other into separate discrete characters.

7. An apparatus for recognizing contiguous characters arranged in character lines, each of said lines constituting a plurality of characters, at least some of said characters touching each other, said lines of characters being arranged in a sub-scanning direction, which is substantially perpendicular to a main scanning direction, which is substantially perpendicular to a main scanning direction, said apparatus comprising:

input means for inputting a plurality of input video signals obtained in response to scanning a plurality of main scanning lines in a predetermined order, said main scanning lines extending in said main scanning direction;

detecting means for detecting a plurality of images corresponding to said input video signals included within each of a plurality of ranges extending line by line from a starting main scanning line of the character to the main scanning lines in the predetermined order to output a plurality of image signals corresponding to the detection images;

normalizing means for normalizing said image signals in order to output a plurality of normalized signals;

comparing means for comparing said normalized signals with a predetermined standard pattern in order to output a plurality of difference signals representing differences from said standard pattern; and segmentation point detecting means for detecting a minimum difference signal, which is a minimum value, out of said minimum difference signals, and detecting one of said main scanning lines corresponding to said minimum difference signal as a segmentation line in order to segment said plurality of characters which touch each other into separate discrete characters.

* * * * *